(12) United States Patent
Yamamoto et al.

(10) Patent No.: US 7,391,406 B2
(45) Date of Patent: Jun. 24, 2008

(54) LIGHT EMISSION CONTROL CIRCUIT UNIFORMLY AND NON-UNIFORMLY CONTROLLING A PLURALITY OF LIGHT-EMITTING ELEMENTS

(75) Inventors: Isao Yamamoto, Kyoto (JP); Koichi Miyanaga, Kyoto (JP)

(73) Assignee: Rohm Co., Ltd. (JP)

( * ) Notice: Subject to any disclaimer, the term of this patent is extended or adjusted under 35 U.S.C. 154(b) by 629 days.

(21) Appl. No.: 10/892,029

(22) Filed: Jul. 15, 2004

(65) Prior Publication Data

US 2005/0057554 A1 Mar. 17, 2005

(30) Foreign Application Priority Data

Sep. 12, 2003 (JP) .............................. 2003-322293

(51) Int. Cl.
*G09G 3/36* (2006.01)

(52) U.S. Cl. ...................... 345/102; 345/211; 345/690

(58) Field of Classification Search ................ 345/211, 345/691, 102, 690, 52, 87, 88, 76, 77
See application file for complete search history.

(56) References Cited

U.S. PATENT DOCUMENTS

2005/0052141 A1* 3/2005 Thielemans et al. ...... 315/169.3

FOREIGN PATENT DOCUMENTS

| JP | 8-241059 | 9/1996 |
|---|---|---|
| JP | 2001-272938 | 5/2001 |
| JP | 2002-111786 | 4/2002 |
| JP | 2002-319497 | 10/2002 |
| JP | 2003-69084 | 3/2003 |
| WO | WO 02/089219 A1 | 11/2002 |

OTHER PUBLICATIONS

Japanese Office Action for Patent Application No. 2003-322293 dated Apr. 3, 2007.

* cited by examiner

*Primary Examiner*—Amr A. Awad
*Assistant Examiner*—Seokyun Moon
(74) *Attorney, Agent, or Firm*—Cantor Colburn LLP (57) ABSTRACT

A booster converter outputs a boosted voltage. A plurality of LEDs emit light of respective colors. The transistors establish or shut connection between the LEDs and a main driving circuit. A variable current circuit feeds a current to drive the LEDs. A PWM control unit effects control to cause the LEDs to emit light with respective tones of color. A PWM circuit executes PWM modulation in accordance with an instruction from the PWM control unit. A setting control unit 138 controls the magnitude of the driving current fed by the variable current circuit in accordance with an instruction from a second light emission control unit. In an image pickup mode, an additional driving circuit feeds a driving current to the LEDs so that the LEDs operate as an electronic flash.

12 Claims, 6 Drawing Sheets

ADDITIONAL DRIVING CIRCUIT

LIGHT EMISSION CONTROL CIRCUIT UNIFORMLY AND NON-UNIFORMLY CONTROLLING A PLURALITY OF LIGHT-EMITTING ELEMENTS

BACKGROUND OF THE INVENTION

1. Field of the Invention

The present invention relates to a light emission control technique and, more particularly, to a light emission control circuit controlling light emission of a plurality of light-emitting elements.

2. Description of the Related Art

Battery-driven portable equipment such as a portable telephone and a personal data assistant (PDA) use light-emitting diodes (LED) for a variety of purposes. For example, LEDs are used to provide backlight for a liquid crystal display (LCD) or an electronic flash light for a charge-coupled device (CCD) camera. LEDs emitting different colors are operated to blink for illumination. Patent Document No. 1 describes the use of blue, green and red LEDs and mixing of colors emitted by these diodes to produce colors other than blue, green and red for illumination. Light emission of an LED is controlled according to the pulse width modulation (PWM) method. Three LEDs are connected to three PWM circuits via three output transistors, respectively.

The drain of the output transistor is connected to the cathode of the LED, the source of the output transistor to a reference voltage, the gate of the transistor to the PWM circuit. When a pulse signal output from the PWM circuit is at a high (H) level so that the output transistor is turned on, the LED emits light. When the duration of H level of the pulse signal is extended so that the duty ratio of the pulse signal is accordingly large, the duration of on period of the output transistor is accordingly extended. As a result of this, the quantity of light emitted by the LED is increased. In order for the three LEDs to provide illumination with a color other than blue, green or red, it is ensured that the quantity of light emitted by the LED differs from color to color by controlling the duty ratio of the pulse signal output from the three PWM circuits accordingly.

RELATED ART LIST (1) Japanese Patent Application Laid-Open No. 2002-111786.

Conventionally, the quantity of light emitted by a plurality of LEDs is controlled in order to control the color of illumination produced by the LEDs. It is more favorable to control the luminance of the overall illumination produced by the plurality of in order to improve the effect of illumination by enabling a wider variety of display. When the quantity of light emitted by the plurality of LEDs is merely increased, the tone of color of illumination is varied resultantly. It is difficult to control the tone of color and luminance of the emitted light simultaneously.

SUMMARY OF THE INVENTION

The present invention is done in view of the above-described circumstances and an object thereof is to provide a light emission control circuit capable of controlling the tone of color and luminance of a plurality of LEDs easily.

The present invention is implemented in one mode by a light emission control circuit. A light emission control circuit according to the invention comprises: power supply sources forming a plurality of light-emitting systems with a plurality of light-emitting elements corresponding to respective colors and driving the plurality of light-emitting elements; first control unit for controlling the capability of said power supply sources to drive the plurality of light-emitting elements; switch elements provided for respective light-emitting systems to establish or shut connection between the light-emitting elements and said power supply sources; switch elements provided for respective light-emitting systems to establish or shut connection between the light-emitting elements and the power supply sources; and a second control unit for turning on and off the switch elements according to pulse width modulation. The first control unit may operate uniformly on the plurality of light-emitting systems so as to adjust the luminance produced by the systems as a whole, and the second control unit may operate non-uniformly on the light-emitting systems so as to adjust the tone of color produced by the light-emitting systems as a whole.

With the apparatus described above, the first control unit needs only to control the tone of color of light emitted by the light-emitting systems and the second control unit needs only to control the luminance of light emitted by the light-emitting systems. Therefore, control of the light-emitting systems is made accurate while control by the first control unit and the second control unit is simplified.

The present invention is implemented in another mode by another light emission control circuit. A light emission control circuit according to this aspect of the invention comprises: power supply sources forming a plurality of light-emitting systems with a plurality of light-emitting elements corresponding to respective colors and driving the plurality of light-emitting elements; a first control unit for controlling the capability of the power supply sources to drive the plurality of light-emitting elements; switch elements provided for respective light-emitting systems to establish or shut connection between the light-emitting elements and the power supply sources; and a second control unit for turning on and off the switch elements according to pulse width modulation. The second control unit may operate uniformly on the plurality of light-emitting systems so as to adjust the luminance produced by the systems as a whole, and the first control unit may operate non-uniformly on the light-emitting systems so as to adjust the tone of color produced by the light-emitting systems as a whole.

With the apparatus described above, the first control unit needs only to control the luminance of light emitted by the light-emitting systems and the second control unit needs only to control the tone of color of light emitted by the light-emitting systems. Therefore, control of the light-emitting systems is made accurate while control by the first control unit and the second control unit is simplified.

The present invention is implemented in still another mode by still another light emission control circuit. A light emission control circuit according to this aspect of the invention comprises: power supply sources forming a plurality of light-emitting systems with a plurality of light-emitting elements corresponding to respective colors and driving the plurality of light-emitting elements; a first control unit for controlling the capability of the power supply sources to drive the plurality of light-emitting elements; switch elements provided for respective light-emitting systems to establish or shut connection between the light-emitting elements and the power supply sources; and a second control unit for turning on and off the switch elements according to pulse width modulation; a booster circuit for boosting a driving voltage applied to each of the plurality of light-emitting systems from the level of a predetermined constant-voltage source to a desired level, and the first control unit and the second control unit operate in cooperation with each other to feed a relatively large current to the plurality of light-emitting systems for a predetermined period of time so that the plurality of light-emitting systems function as a source of lighting.

In the above-described apparatus, the first control unit and the second control unit adjust light emission by the plurality of light-emitting systems. The control units are also capable of controlling a large current to be fed so that the plurality of light-emitting systems are used as a source of lighting.

Optional combinations of the aforementioned constituting elements, and implementations of the invention in the form of methods, apparatuses and systems may also be practiced as additional modes of the present invention.

Moreover, this summary of the invention does not necessarily describe all necessary features so that the invention may also be sub-combination of these described features.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

Before describing the present invention in detail, a summary of will be given. An embodiment of the present invention relates to a control apparatus for controlling the light emission of a plurality of LEDs provided in a communication apparatus such as a portable telephone. A plurality of LEDs include green LEDs, blue LEDs and red LEDs. For example, selected ones of the LEDs blink in a predetermined pattern to provide illumination responsive to incoming call sound of the communication apparatus. In one mode of light emission, a single LED is lighted. In others, a plurality of LEDs are lighted simultaneously so that the color of light emitted by the entirety of the LEDs is different from the colors of the individual lighted LEDs. The tone of color produced by the plurality of LEDs is determined by the ratio of quantity of light emitted by the respective lighted LEDs. For example, if the green LED and the red LED emit light with the same intensity and if the blue LED does not emit light, a yellow light is produced. In the control apparatus according to the present invention, the LEDs and the PWM circuits are connected to each other via transistors. By changing the duty ratio of pulse signals generated by the PWM circuits, the duration of on period of the transistors is changed. The duration of light emission by the LEDs are changed according to the duration of on period of the transistors so that the tone of color of light emitted is determined accordingly.

The control apparatus of the present invention controls the luminance of light emitted by the plurality of LEDs as well as the tone of color thereof. For example, a single red LED may be lighted to produce a bright red light or a dark red light. For this purpose, the magnitude of current driving an LED in the on period of transistor is controlled. In order to let an LED to emit a bright light, the driving current is increased in magnitude. In order to let an LED to emit a dark light, the driving current is reduced in magnitude.

The communication apparatus of the embodiment of the present invention is further provided with an image pickup apparatus such as a camera. The plurality of LEDs are also used to produce an electronic flash light for the image pickup apparatus. In order to cause the plurality of LEDs to function as an electronic flash, the control circuit of the embodiment causes the green LED, the blue LED and the red LED to be driven by respectively controlled driving currents, so as to produce a white light. In order to obtain a quantity of emitted light larger than that of the illumination, the control circuit increases the driving current fed to the plurality of LEDs.

Figure 1:
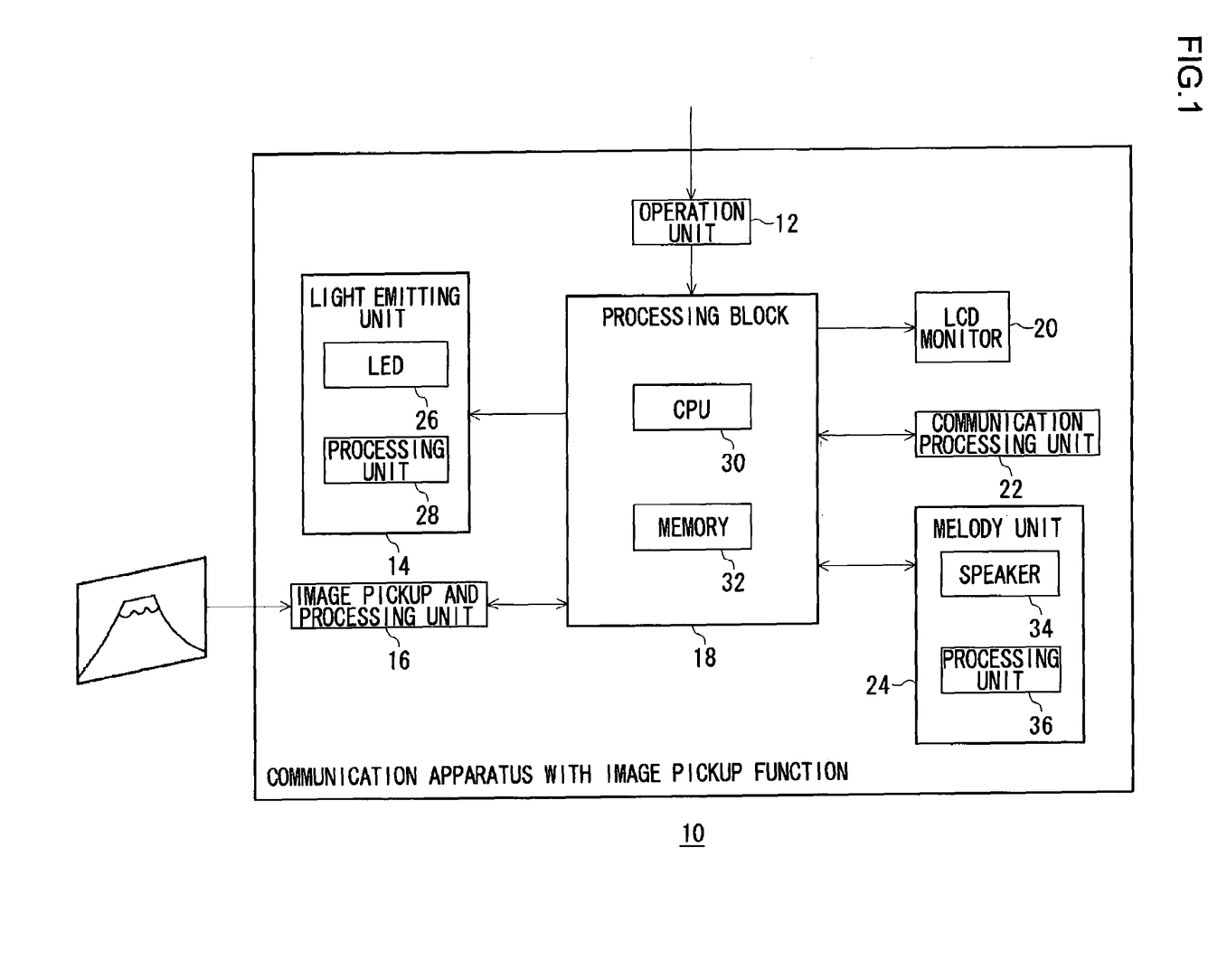
FIG. 1 shows a construction of a communication apparatus provided with an image pickup function according to an embodiment of the present invention.

FIG. 1 shows a construction of a communication apparatus 10 with an image pickup function. The communication apparatus 10 includes an operation unit 12, a light-emitting unit 14, an image pickup and processing unit 16, a processing block 18, an LEC monitor 20, a communication processing unit 22 and a melody unit 24. Further, the light-emitting unit 14 includes an LED 26 and a processing unit 28. The processing block 18 includes a CPU 30 and a memory 32. The melody unit 24 includes a loud speaker 34 and a processing unit 36.

The communication processing unit 22 executes processes necessary for communication. The mobile communication system considered here is a personal digital cellular (PDC) system. However, mobile communication systems such as a personal handy phone system (PHS) and a code division multiple access (CDMA) system are not excluded.

The image pickup and processing unit 16 picks up and processes images in response to an instruction from the processing block 18. The image pickup and processing unit 16 includes a lens (not shown), a diaphragm, an optical low-pass filter (LPF), a CCD, a signal processing unit, etc. Electric charges are accumulated in the CCD in accordance with the light quantity of a subject image formed on a light-receiving surface of the CCD. The accumulated charges are read out as a voltage signal. The voltage signal is dissolved into R, G and B components by the signal processing unit, whereupon white balance adjustment and gamma correction are performed. Subsequently, the R, G and B signals are subject to analog-to-digital conversion. Resultant digital image data are then output to the processing block 18.

In relation to the communication function, the operation unit 12 includes buttons for allowing the user to input telephone numbers and the like. In relation to the image pickup function, the operation unit 12 includes a power switch, a release switch and the like that allow the user to pick up images and set various operation modes. In relation to the communication function, the LCD monitor 20 displays a telephone number of the party at the other end of the line, etc. In relation to the image pickup function, the LCD monitor 20 displays image pickup/play modes, a zoom scale and the like in addition to displaying the image of a subject.

The melody unit 24 plays a predetermined call incoming sound in order to notify the user of call incoming when the call processing unit 22 detects an incoming call. The processing unit 36 of the melody unit 24 executes a program so as to play the call incoming sound from pre-recorded data. The speaker 34 outputs the call incoming sound played by the processing unit 36. The melody unit 24 may play a predetermined melody instead of the call incoming sound.

When the communication processing unit 22 detects an incoming call, the light-emitting unit 14 causes the LED 26 to blink for illumination in synchronization with the call incoming sound. The processing unit 28 executes a process for causing the LED 26 to blink. When the image pickup apparatus 10 is used as an image pickup apparatus, the processing unit 28 causes the LED 26 to emit an electronic flash light.

The processing block 18, including the central processing unit (CPU) 30 and the memory 32, effects overall control of the whole process in the image pickup apparatus 10. An external memory may be used as the memory 32.

Figure 2:
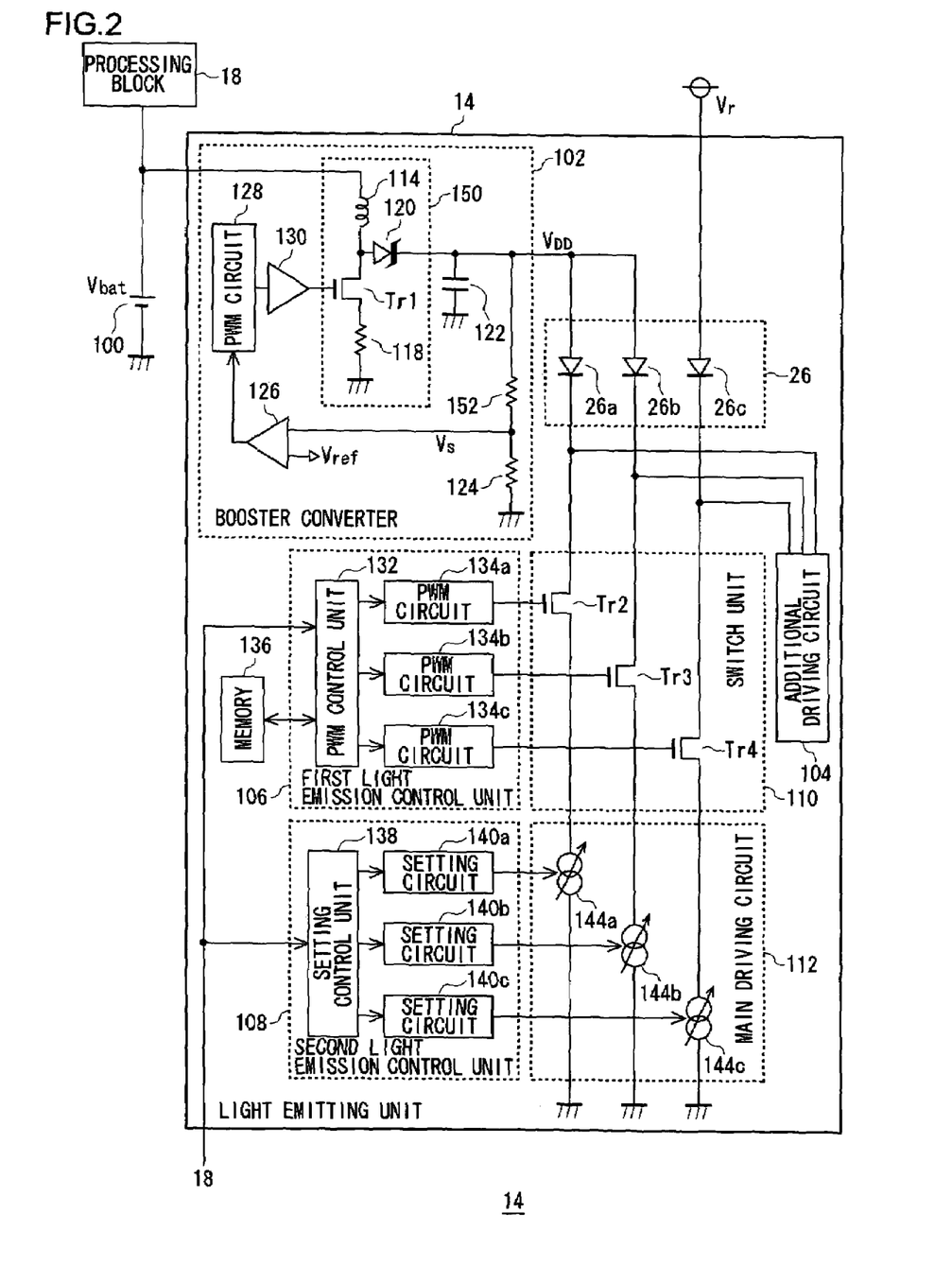
FIG. 2 shows a construction of a light-emitting unit of FIG. 1.

FIG. 2 shows a construction of the light-emitting unit 14. The light-emitting unit 14 is connected to a lithium ion battery 100 and the processing block 18. The light-emitting unit 14 includes: a booster converter 102; a first LED 26a, a second LED 26b and a third LED 26c generically referred to as the LED 26; an additional driving circuit 104, a first light emission control unit 106, a second light emission control unit 108, a switch unit 110, a main driving circuit 112 and a memory 136. Further, the booster converter 102 includes a boost chopper circuit 150, a capacitor 122, a first resistor 152, a second resistor 124, an differential amplifier 126, a PWM circuit 128 and a driver 130. The boost chopper circuit 150 includes an inductance 114, a resistor 118, a Schottky barrier diode 120 and a transistor Tr1. The first light emission control unit 106 includes: a PWM control unit 132; and a first PWM circuit 134a, a second PWM circuit 134b and a third PWM circuit 134c generically referred to as a PWM circuit 134. The second light emission control unit 108 includes: a setting control unit 138; and a first setting circuit 140a, a second setting circuit 140b and a third setting circuit 140c generically referred to as a setting circuit 140. The switch unit 110 includes a transistor Tr1, a transistor Tr2 and a transistor Tr3. The main driving circuit 112 includes a first variable current circuit 144a, a second variable current circuit 144b and third variable current circuit 144c generically referred to as a variable current circuit 144. Those parts of the light-emitting unit 14 other than the LED 26 correspond to the processing unit 28 of FIG. 1.

The booster converter 102 boosts an input voltage according to a switching strategy, the input voltage being a battery voltage Vbat of the lithium ion battery 100, and outputs a boosted voltage Vdd. It is assumed that the battery voltage Vbat is 3V. The boost chopper circuit 150 charges energy in and discharges energy from the inductance 114 by an on and off operation of the transistor Tr1, thus boosting the battery voltage Vbat to a boosted voltage Vdd. A drain current flows through the resistor 118 via the inductance 114 while the transistor Tr1 is turned on in the boost chopper circuit 150, allowing the battery voltage Vbat to store magnetic energy in the inductance 114. When the transistor Tr1 is turned off subsequently, the magnetic energy stored in the inductance 114 while the transistor Tr1 is turned on is discharged as electric energy and turns into a current that flows through the Schottky barrier diode 120. The voltage generated in the inductance 114 is positively superimposed on the battery voltage Vbat and stabilized by the main driving circuit 112 before being output as the boosted voltage Vdd.

The boost ratio of the boosted voltage Vdd output by the boost chopper circuit 150 is determined by a duration ratio between an on period and an off period of the transistor Tr1 operated as a switch. The PWM circuit 128 produces the on and off duration ratio of the switch. Assuming that the on and off switching period of the switch is T and the on duration of the switch is Ton, the PWM circuit 128 generates a pulse signal with a duty ratio of Ton/T. The driver 130 turns the transistor Tr1 on and off in response to the pulse signal generated by the PWM circuit 128. When the pulse signal is at a high (H) level, the transistor Tr1 is turned on. When the pulse signal is at a low (L) level, the transistor Tr1 is turned off.

The pulse width of the pulse signal generated by the PWM circuit 128 varies in accordance with an output from the differential amplifier 126. The differential amplifier 126 compares a detected voltage Vs derived from dividing the boosted voltage Vdd by the two voltage dividing resistors including the first resistor 152 and the second resistor 124 with a reference voltage Vref from a reference voltage source, and amplifies an error between the reference voltage Vref and the detected voltage Vs so as to feed a resultant voltage back to the PWM circuit 128. The PWM circuit 128 modulates the pulse width of the pulse signal according to the output of the differential amplifier 126 by controlling an on duration Ton of the switch, and matches the detected voltage Vs with the reference voltage Vref by feedback control.

The first LED 26a emits a green light, the second LED 26b emits a blue light and the third LED 26c emits a red light. Since the first LED 26a and the second LED 26b are generally operated with a drive voltage of about 4.5V, the above-mentioned boosted voltage Vdd is set to 4.5V. Since the third LED 26c is generally operated with a drive voltage of about 2.5V, Vr is set to 2.5V. When the LED 26 is used for illumination, the main driving circuit 112 described later feeds a current of a maximum of about 25 mA to drive the LED 26.

The transistors Tr2 through Tr4 are provided between the LED 26 and the main driving circuit 112 described later so as to establish or shut connection between the LED 26 and the main driving circuit 112. If the voltage applied to a gate of the transistor Tr2 is at a high (H) level so that the transistor Tr2 is turned on, the first LED 26a and the first variable current circuit 144a described later are connected to each other. The transistor Tr3 and the transistor Tr4 are operated similarly. LEDs in the LED 26 are lighted while the corresponding ones of the transistors Tr2 through Tr4 are being turned on. The transistors Tr2 through Tr4 are turned on independently by the first later light emission control unit 106 described later.

The variable current circuit 144 feeds a current to drive the LED 26. The magnitude of the current fed by the variable current circuit 144 is controlled by the second light emission control unit 108 described later to have a plurality of discrete levels, the maximum being about 25 mA as described before. The current at a plurality of discrete levels changes the brightness of the LED 26. The first variable current circuit 144a through the third variable current circuit 144c may feed currents of mutually different levels. It is assumed here that they feed a current of the same magnitude.

The PWM control unit 132 effects control such that the LED 26 is lighted for illumination in a predetermined tone of color, in accordance with illumination data for the LED 26 stored in the memory 136 and an instruction from the processing block 18. The instruction from the processing block 18 may include an instruction indicating call incoming. The illumination data for the LED 26 stored in the memory 136 may include data that causes two or more LEDs in the LED 26 to be lighted simultaneously at call incoming so that a mixture of green, blue and red light is produced. The data may also include data for turning the transistors Tr2 through Tr4 to be on and off according a predetermined rule so that the LEDs in the LED 26 are lighted in a designated order.

In addition to the data for merely turning the transistors Tr2 through Tr4 on and off, the illumination data for the LED 26 may also include data for controlling individual transistors by turning the transistors Tr2 through Tr4 on and off for mutually different periods of time so that the LEDs in the LED 26 produce mutually different quantity of light to produce a predetermined tone of color. The illumination data may include data for causing the LEDs in the LED 26 to produce the same quantity of light when the LED 26 is used as an electronic flash.

The PWM circuit 134 performs PWM modulation in accordance with an instruction from the PWM control unit 132. When the first PWM circuit 134*a* is directed by the PWM control unit 132 to increase the quantity of light produced by the first LED 26*a*, the first PWM circuit 134*a* generates a pulse signal for extending the duration of the highlevel and outputs the signal to the transistor Tr2. The second PWM circuit 134*b* and the third PWM circuit 134*c* are operated similarly.

The setting control unit 138 controls the magnitude of the driving current fed by the variable current circuit 144 according to an instruction from the second light emission control unit 108. In order to increase the luminance of the LED 26, the operation of the setting circuit 140 is controlled so as to increase the driving current fed by the variable current circuit 144. As mentioned earlier, the driving current fed by the first variable current circuit 144*a* through the third variable current circuit 144*c* are assumed to be identical in magnitude. Accordingly, the setting control unit 138 controls the first setting circuit 140*a* through the third setting circuit 140*c* in the same manner.

The additional driving circuit 104 feeds a driving current to the LED 26 so that the LED 26 is operated to produce an electronic flash light when the communication apparatus 10 is operated as an image pickup apparatus. When the LED 26 is operated to provide illumination, the driving current of a maximum of 25 mA is fed. When the LED 26 is operated to provide an electronic flash light, the driving current is set to have a maximum of 150 mA. By feeding the driving current so that the quantity of light produced by the plurality of LEDs is identical, it is ensured that the tone of color produced by the plurality of LEDs in the LED 26 is white. The details of the additional driving circuit 104 will be given later.

Figure 3A:
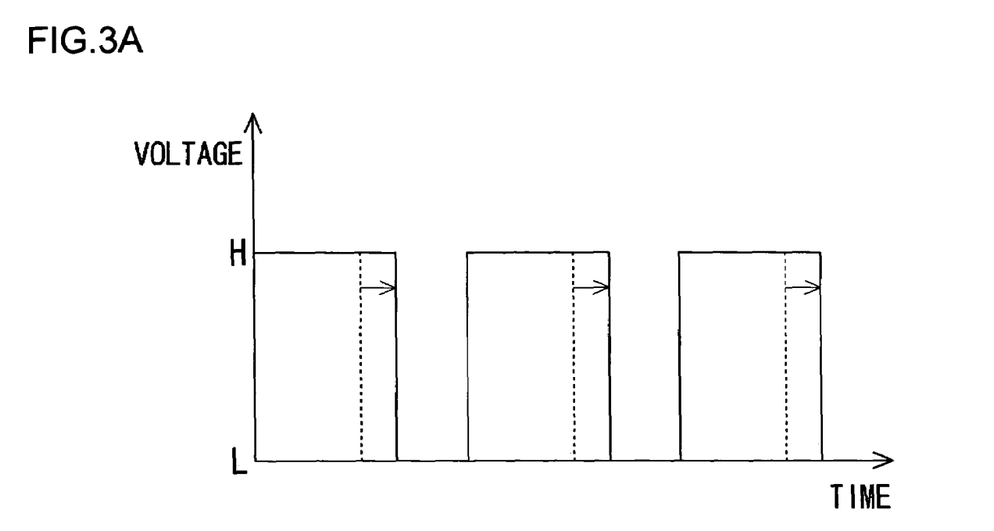
FIG. 3A shows an operation of a first light emission control unit of FIG. 2.

FIG. 3A shows an operation of the first light emission control unit 106 and shows, in particular, a pulse-width modulated pulse signal generated by the first light emission control unit 106. As illustrated, the first light emission control unit 106 generates a pulse signal in which a high (H) level and a low (L) level alternate. The transistors Tr2 through Tr4 are turned on when the H level voltage is applied thereto, resulting in associated LEDs in the LED 26 being lighted. To increase the quantity of light produced by the LED 26, the first light emission control unit 106 extends the duration of the H level so that the shape of the pulse is changed from the dotted line to the solid line. In other words, the duty ratio is increased. An increase in the duty ratio for a single LED of the LED 26 means an increase in the luminance of that LED and a difference from LED to LED in the duty ratios.

Figure 3B:
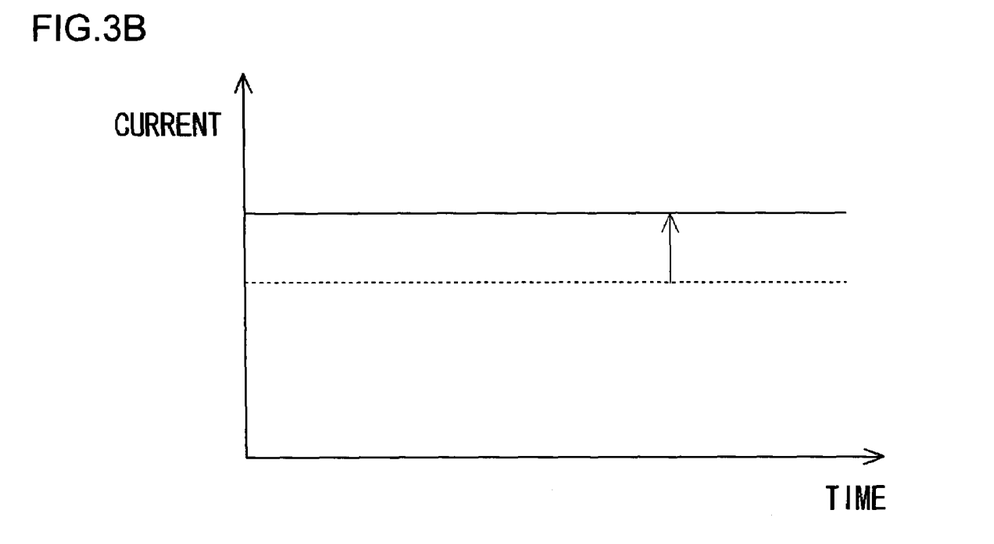
FIG. 3B shows an operation of a second light emission control unit of FIG. 2.

FIG. 3B shows an operation of the second light emission control unit 108 and shows, in particular, the magnitude of the driving current fed by the variable current circuit 144. By controlling the magnitude of the driving current to change from the level of the dotted line to the level of the solid line, the luminance of the LED 26 is increased. An increase in the duty ratio for a single LED of the LED 26 means an increase in the luminance of that LED and a difference from LED to LED in the duty ratios.

Figure 4:
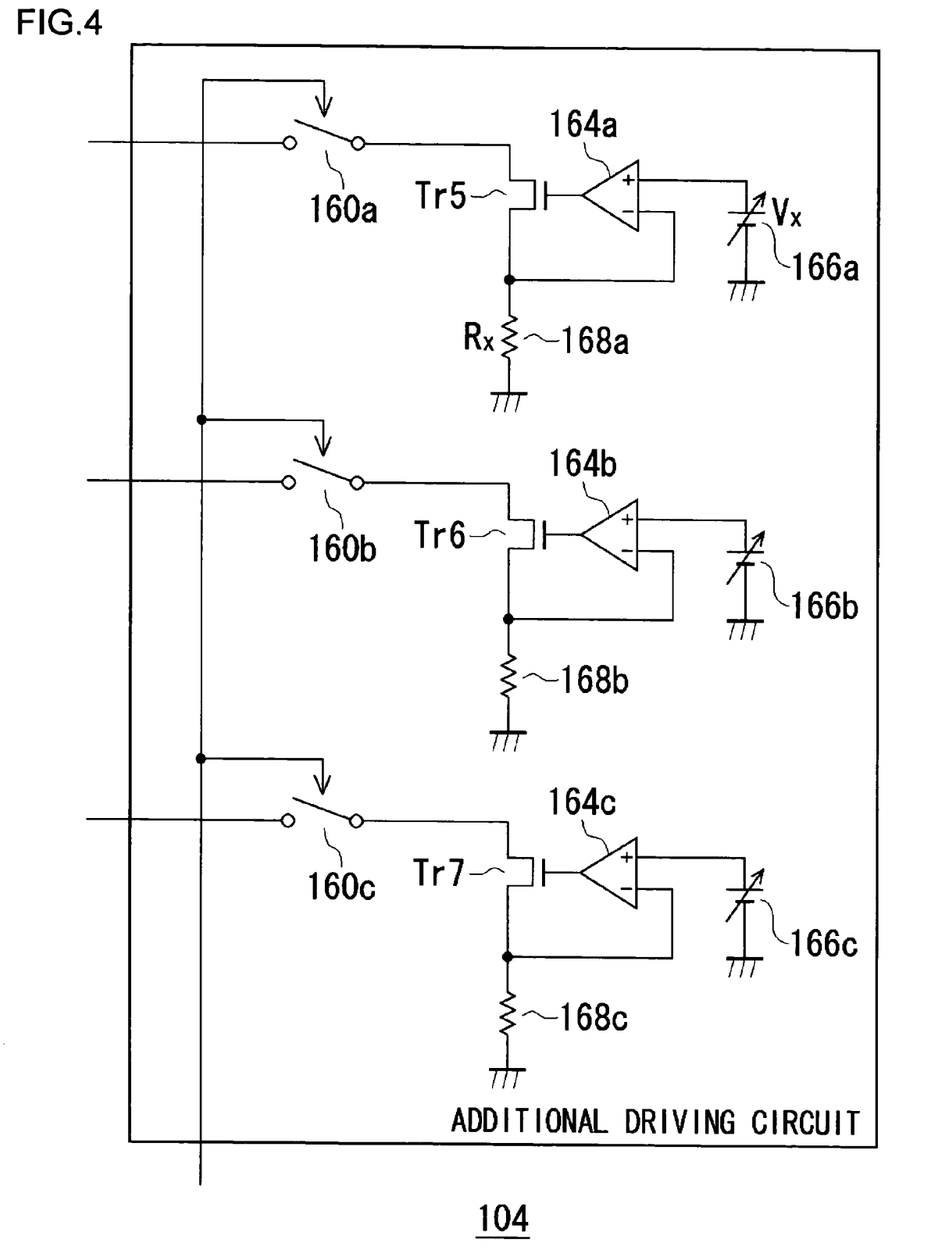
FIG. 4 shows a construction of an additional driving circuit of FIG. 2.

FIG. 4 shows a construction of the additional driving circuit 104. The additional driving circuit 104 includes: a first switch for electronic flash light 160*a*, a second switch for electronic flash light 160*b* and a third switch for electronic flash light 160*c* generically referred to as a switch for electronic flash light 160; a first differential amplifier 164*a*, a second differential amplifier 164*b* and a third differential amplifier 164*c* generically referred to as an differential amplifier 164; a first variable power source 166*a*, a second variable power source 166*b* and a third variable power source 166*c* generically referred to as a variable power source 166; a first resistor 168*a*, a second resistor 168*b* and a third resistor 168*c* generically referred to as a resistor 168; and transistors Tr5 through Tr7.

The first switch for electronic flash light 160*a* is connected to the first LED 26*a*, the second switch 160*b* to the LED 26*b*, and the third switch 160*c* to the LED 26*c*. The switches are turned on in response to an instruction from the processing block 18 (not shown). Since the switches are operated in the same manner, only the system connected to the switch 160*a* for electronic flash light will be described.

The non-inverting input terminal of the first differential amplifier 164*a* is connected to the first variable power source 166*a*, the inverting input terminal to the source terminal of the transistor Tr5, and the output terminal to the gate terminal of the transistor Tr5. A voltage commensurate with a voltage across the inverting input terminal and the non-inverting input terminal is output from the output terminal. If the inverting input terminal and the non-inverting input terminal are imaginary shorted, the voltage at the inverting input terminal is approximately equal to a voltage Vx at the non-inverting input terminal. Further, a current defined by Vx/Rx flows through the first resistor 168*a* of an resistance value Rx and drives the LED 26. The variable power source 166 and the resistor 168 are configured so that a current of a maximum of 150 mA is fed in order to use the LED 26 to provide electronic flash light.

The operation of the light-emitting unit 14 constructed as described above will now be described. When the operation for illumination is designated by the processing block 18, the voltage Vbat output from the lithium ion battery 100 is boosted to Vdd by the booster converter 102 and applied to the first LED 26*a* and the second LED 26*b*. The voltage Vr lower than the voltage Vbat is applied to the third LED 26*c*. The PWM control unit 132 determines the quantity of light emission to be produced by each of the plurality of LEDs in the LED 26 so that a light with a desired tone of color is emitted, in accordance with an instruction from the processing block 18. The PWM control unit 132 then feeds the corresponding duty ratio of pulse signal to the PWM circuit 134. The PWM circuit 134 generates pulse width modulated signals so as to turn the transistors Trs through Tr4 on for a duration defined by the H level period of the pulse signal. The second light emission control unit 108 determines the quantity of light emission produced by each of the LEDs in the LED 26 so that a light with a desired luminance level is emitted, in accordance with an instruction from the processing block 18. According to the quantity of light emission thus determined, the second light emission control unit 108 adjusts the magnitude of current fed by the variable current circuit 144 so as to drive the LED 26 with the current.

When the operation for electronic flash light is designated by the processing block 18, the PWM control unit 132 designates the duty ratios of pulse signals to the PWM circuit 134 so that a white light is emitted by the LED 26. By turning on the switch for electronic flash light 160 and causing a larger current to flow in the LED 26, light emission higher in intensity than illumination is obtained.

Figure 5:
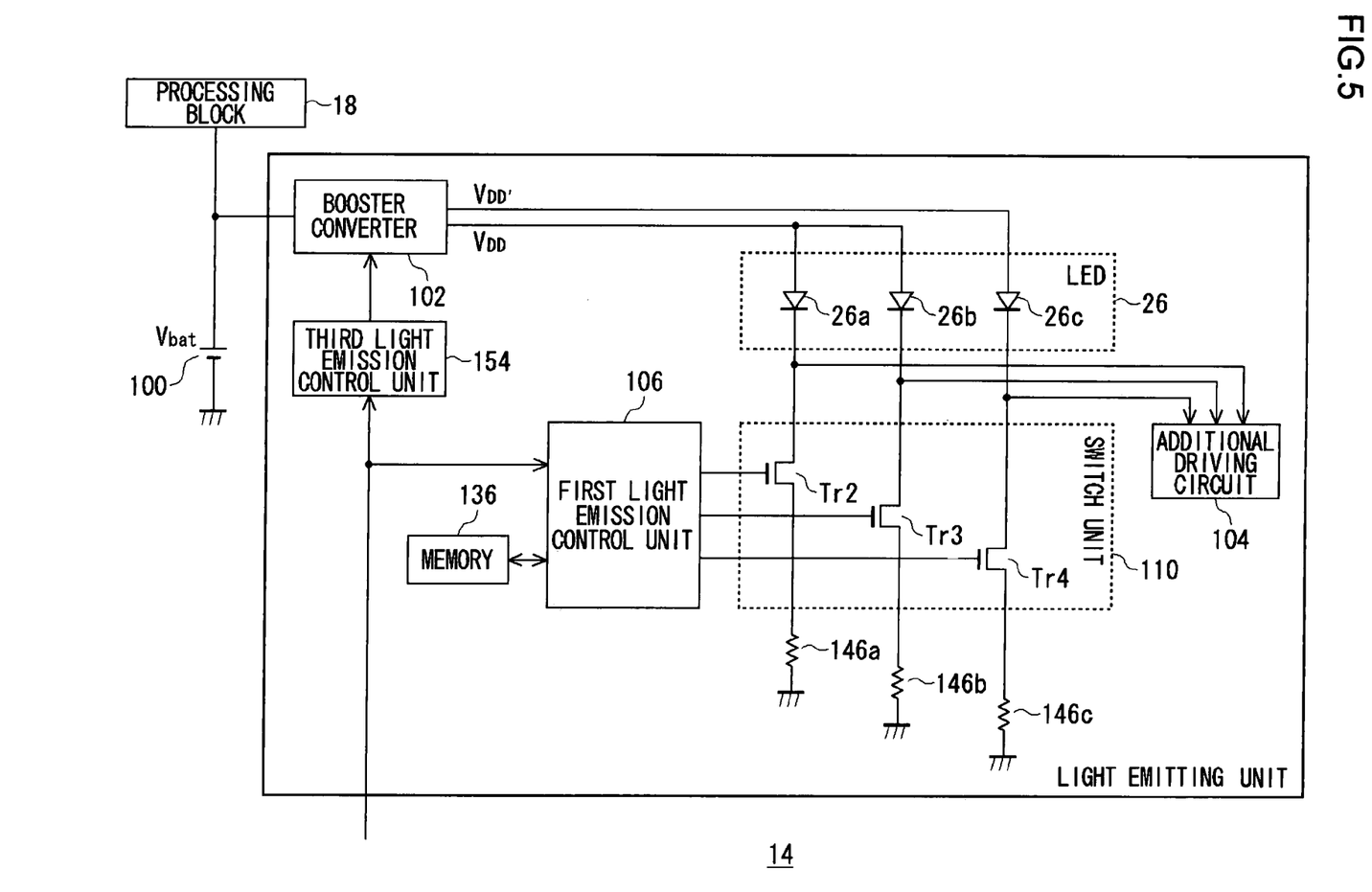
FIG. 5 shows a construction of a light-emitting unit of FIG. 1

FIG. 5 shows a construction of the light-emitting unit 14 of a type different from that of FIG. 2. Unlike the light-emitting unit 14 of FIG. 2, the light-emitting unit 14 of FIG. 5 includes a third light emission control unit 154. The main driving circuit 112 includes a first resistor 146a, a second resistor 146b and a third resistor 146c generically referred to as a resistor 146.

The third light emission control unit 154 directs the booster converter 102 to generate a voltage for driving the LED 26 in accordance with an instruction from the processing block 18. As described above, the first light emission control unit 106 controls the tone of color of light emitted by the plurality of LEDs in the LED 26. The third light emission control unit 154 controls the luminance of light emitted by the plurality of LEDs in the LED 26. It is assumed that the luminance of light emitted by the plurality of LEDs in the LED 26 is identical to each other.

As described above, the booster converter 102 generates the boosted voltage Vdd from the battery voltage Vbat. Further, a parallel Schottky barrier diode 120 is included in the booster converter 102 so that a boosted voltage Vdd' of a level different from the level of the boosted voltage Vdd is generated so as to drive the third LED 26c having a threshold voltage different from the other LEDs in the LED 26. A plurality of voltages Vref are provided in order to generate different boosted voltages. The resistor 146 converts the voltage into a current that drives the LED 26.

Figure 6:
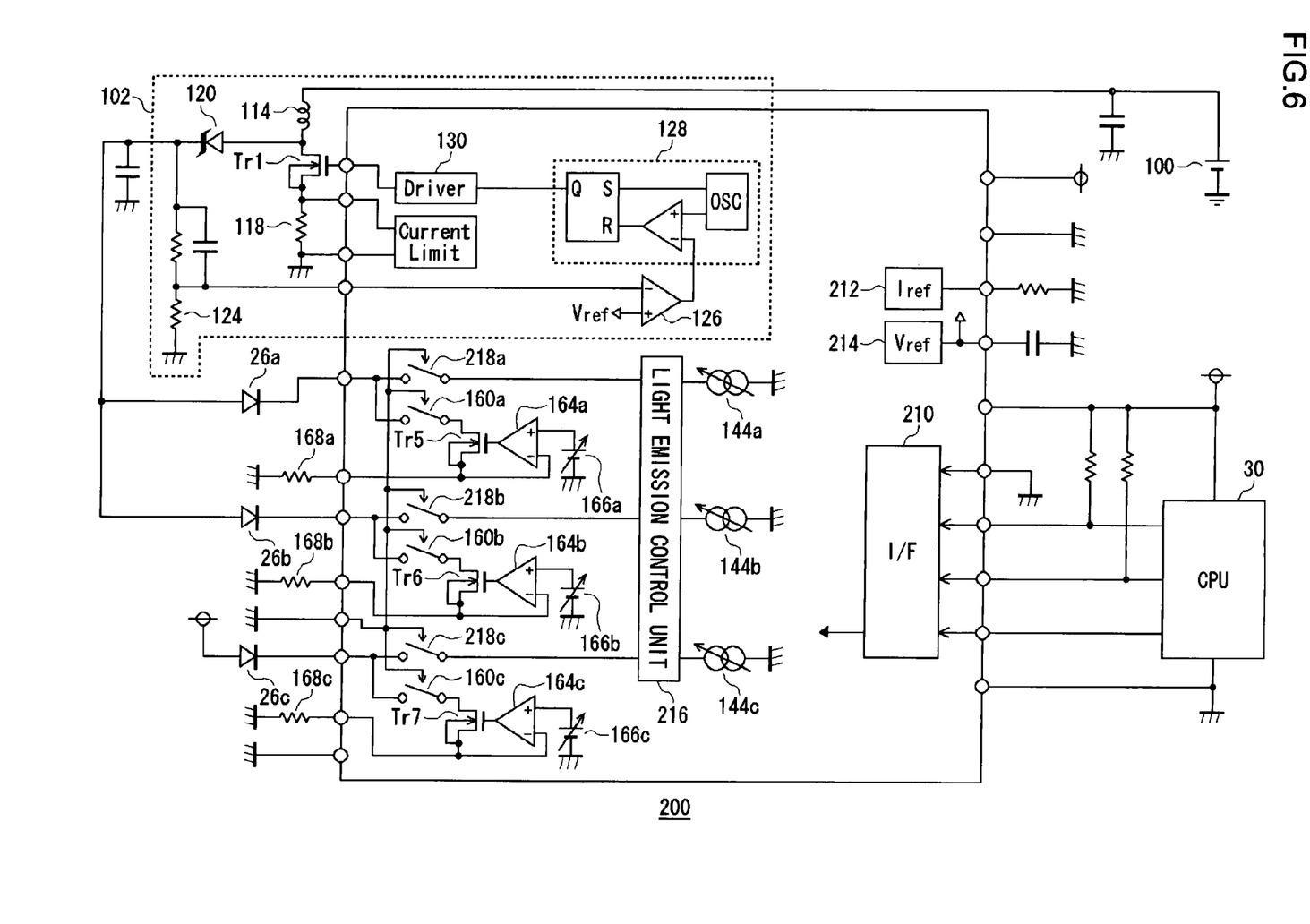
FIG. 6 shows a construction of a light emission control IC according to the embodiment.

FIG. 6 shows a construction including a light emission control IC 200 that actually implements the embodiment of the invention. Referring to FIG. 6, those components that are identical to the corresponding components already described are denoted with the same consistent reference symbols and the description thereof is omitted. The light emission control IC 200 includes: an interface circuit 210; an Iref circuit 212; a Vref circuit 214; a light emission control unit 216; an first switch for illumination 218a, a second switch for illumination 218b and a third switch for illumination 218c generically referred to as a switch for illumination 218.

The light emission control IC 200 is different from the light-emitting unit 14 of FIG. 2 in that the inductance 114, the resistor 118, the Schottky barrier diode 120 and the transistor Tr1 of the booster converter 102 are not included in the IC. The LED 26 and the resistor 168 are not included either.

The interface circuit 210 receives a signal from the CPU 30 and outputs a signal to the CPU 30. The Iref circuit 212 and the Vref circuit 214 generate a reference current and a reference voltage, respectively. The voltage Vref generated by the Vref circuit 214 is input to the differential amplifier 126. The light emission control unit 216 as shown includes the first light emission control unit 106 and the second light emission control unit 108 of FIG. 2. The light emission control unit 216 controls the variable current circuit 144 using a control signal line (not shown).

The switch for illumination 218 is turned on when the LED 26 is used for illumination and turned off when the LED 26 is used to provide an electronic flash light. In the light-emitting unit 14 of FIGS. 2 and 5, when the LED 26 is used to provide an electronic flash light, the current generated by the variable power source 166 and the resistor 168, and the current generated by the variable current circuit 144 flow through the LED 26. In the IC, only the former current flows.

According to the embodiment of the present invention, it is possible to control the tone of color of light emitted by the LED elements by adjusting the duty ratios of pulse signals. By controlling the magnitude of current for driving the LED elements, the luminance of light emitted by the LED elements is controlled. Thus, the tone of color and luminance are independently adjusted. Since the tone of color and luminance of light emitted by the individual LED elements are independently adjustable, the tone of color and luminance are easily adjusted. The luminance can easily be changed while the tone of color of light already emitted by the LED elements is maintained. Alternatively, the tone of color can easily be changed while the luminance is maintained.

Exemplary correspondence between the present invention and the embodiment will be described. The power source corresponds to the booster converter 102. The first control unit corresponds to the second light emission control unit 108 and the main driving circuit 112. The switch element corresponds to the switch unit 110. The second control unit corresponds to the light emission control unit 106. The first control unit also corresponds to the third light emission control unit 154. The booster circuit 154 corresponds to the additional driving apparatus 104. As mentioned before, the correspondence is only exemplary in nature. Even if parts of the booster converter 102 are missing, the construction is still within the scope of the present invention.

The present invention has been described based on the embodiments, and the above first to sixth embodiments are only exemplary. It is therefore understood by those skilled in the art that there exist other various modifications to the combination of each component and process described above and that such modifications are encompassed by the scope of the present invention.

By ensuring that the duty ratios of pulse signals generated by the plurality of circuits of the PWM circuit 134 differ from circuit to circuit, the tone of color of light emitted by the plurality of LEDs in the LED 26 is controlled. By ensuring that the plurality of circuits of the setting circuit 140 generate the same control signal to control the plurality of circuits of the variable current circuit 144 to feed a current of the same magnitude, the luminance of light emitted by the plurality of LEDs of the LED 26 is controlled. Alternatively, by ensuring that the duty ratios of pulse signals generated by the plurality of circuits of the PWM circuit 134 are identical to each other, the tone of color of light emitted by the plurality of LEDs in the LED 26 may be controlled. By ensuring that the plurality of circuits of the setting circuit 140 generate different control signals to control the plurality of circuits of the variable current circuit 144 to feed currents of different magnitude, the tone of color of light emitted by the plurality of LEDs of the LED 26 may be controlled. The mutually different duty ratios of pulse signals generated by the plurality of circuits of the PWM circuit 134 may be changed simultaneously in accordance with the luminance of desired light, while maintaining the ratio-to-ratio proportions. According to the embodiment, the construction of PWM circuits is simplified. In other words, the tone of color of light emitted by the plurality of LEDs of the LED 26 is controlled by adjusting the signals generated by the plurality of circuits of the PWM circuit 134 and the plurality of circuits of the variable current circuit 144.

Although the present invention has been described by way of exemplary embodiments, it should be understood that many changes and substitutions may further be made by those skilled in the art without departing from the scope of the present invention which is defined by the appended claims.

What is claimed is:

1. A light emission control circuit comprising:
   a booster circuit for boosting a voltage of a constant-voltage source so as to drive a plurality of light-emitting elements corresponding to respective colors;
   variable current circuits for driving the plurality of light-emitting elements;
   switch elements for establishing or shutting connection between the light-emitting elements and the variable current circuits;

a first control unit for controlling the capability of said variable current circuits to drive the plurality of light-emitting elements;

a second control unit for turning on and off said switch elements according to pulse width modulation; and an additional driving circuit which 1) feeds a driving current to the plurality of light-emitting elements when operating the plurality of light-emitting elements as an electronic flash light, 2) connects a variable power source to the light-emitting elements via a switch for electronic flash light, a transistor and a differential amplifier, 3) connects a resistor to the source terminal of the transistor and the non-inverting input terminal of the differential amplifier, and 4) uses the variable power source to set a driving current for electronic flash light, wherein said first control unit adjusts luminance, responsive to an external instruction from a controller, produced by the entirety of the plurality of light-emitting elements, by controlling driving currents of the variable current circuits so that the ratio of the currents driving the plurality of light-emitting elements remains unchanged; and said second control unit adjusts tone of color, responsive to an external instruction from the controller, produced by the entirety of the plurality of light-emitting elements, by independently controlling the duty ratio of pulse signals from the switch elements.

2. The light-emission control circuit according to claim 1, wherein, in each of the plurality of light-emitting systems, the switch element is constructed of a transistor provided between the light-emitting element and the variable current circuit, and wherein the transistor establishes or shuts connection between the light-emitting element and the variable current circuit.

3. The light-emission control circuit according to claim 1, wherein said first control unit increase a current for driving the plurality of light-emitting elements to increase the luminance of the plurality of light-emitting elements.

4. The light-emission control circuit according to claim 1, wherein said second control unit stores, for on and off control, data designating on and off of said switch elements according to a predetermined rule.

5. The light-emission control circuit according to claim 1, wherein said second control unit stores, for on and off control, data designating said switch elements corresponding to the plurality of light-emitting systems to be turned on for durations different from element to element.

6. The light-emission control circuit according to claim 1, wherein said second control unit extends, for on and off control, a duration of on period of a desired one of said switch elements in order to increase the quantity of light emitted by the corresponding light-emitting system.

7. A light emission control circuit comprising:
a booster circuit for boosting a voltage of a constant-voltage source so as to drive a plurality of light-emitting elements corresponding to respective colors;
variable current circuits for driving the plurality of light-emitting elements;
switch elements for establishing or shutting connection between the light-emitting elements and the variable current circuits;
a first control unit for controlling the capability of said variable current circuits to drive the plurality of light-emitting elements;
a second control unit for turning on and off said switch elements according to pulse width modulation; and
an additional driving circuit which 1) feeds a driving current to the plurality of light-emitting elements when operating the plurality of light-emitting elements as an electronic flash light, 2) connects a variable power source to the light-emitting elements via a switch for electronic flash light, a transistor and a differential amplifier, 3) connects a resistor to the source terminal of the transistor and the non-inverting input terminal of the differential amplifier, and 4) uses the variable power source to set a driving current for electronic flash light, wherein
said first control unit adjusts tone of color, responsive to an external instruction from a controller, produced by the entirety of the plurality of light-emitting elements, by independently controlling currents of the variable current circuits for driving the plurality of light-emitting elements, and
said second control unit adjusts luminance, responsive to and external instruction from the controller, produced by the entirety of the plurality of light-emitting elements, by controlling the duty ratio of pulse signals from the switch elements so that the duty ratio of the pulse signals remains unchanged.

8. The light emitting circuit according to claim 7, wherein, in each of the plurality of light-emitting systems, the switch element is constructed of a transistor provided between the light-emitting element and the variable current circuit, and wherein the transistor establishes or shuts connection between the light-emitting element and the variable current circuit.

9. The light-emission control circuit according to claim 7, wherein said first control unit increase a current for driving the plurality of light-emitting elements to increase the luminance of the plurality of light-emitting elements.

10. The light-emission control circuit according to claim 7, wherein said second control unit stores, for on and off control, data designating on and off of said switch elements according to a predetermined rule.

11. The light-emission control circuit according to claim 7, wherein said second control unit stores, for on and off control, data designating said switch elements corresponding to the plurality of light-emitting systems to be turned on for durations different from element to element.

12. The light-emission control circuit according to claim 7, wherein said second control unit extends, for on and off control, a duration of on period of a desired one of said switch elements in order to increase the quantity of light emitted by the corresponding light-emitting system.

* * * * *